US012799978B2

(12) United States Patent
Bertolini et al.

(10) Patent No.: US 12,799,978 B2
(45) Date of Patent: Nov. 17, 2026

(54) BEARING UNIT FOR APPLICATIONS IN ADVERSE OPERATING CONDITIONS

(71) Applicant: Aktiebolaget SKF, Gothenburg (SE)

(72) Inventors: Andrea A. Bertolini, Carrara (IT); Fausto Baracca, Massa (IT); Pasquale Frezza, Aversa (IT); Alessio Nebbia Colomba, Pisa (IT)

(73) Assignee: Aktiebolaget SKF, Gothenburg (SE)

( * ) Notice: Subject to any disclaimer, the term of this patent is extended or adjusted under 35 U.S.C. 154(b) by 33 days.

(21) Appl. No.: 18/654,083

(22) Filed: May 3, 2024

(65) Prior Publication Data

US 2024/0376935 A1 Nov. 14, 2024

(30) Foreign Application Priority Data

May 10, 2023 (IT) ........................ 102023000009333

(51) Int. Cl.
*F16C 33/78* (2006.01)

(52) U.S. Cl.
CPC ...... *F16C 33/7853* (2013.01); *F16C 33/7806* (2013.01)

(58) Field of Classification Search
CPC ................ F16C 33/7806; F16C 33/782; F16C 33/7823; F16C 33/784; F16C 33/7843; F16C 33/7853; F16C 33/7876
See application file for complete search history.

(56) References Cited

U.S. PATENT DOCUMENTS 8,561,996 B2 10/2013 Picatto et al.
8,799,386 B2 8/2014 Majeti et al.
11,933,361 B2 * 3/2024 Bertolini ............. F16C 33/7889
2003/0063824 A1 4/2003 Aldridge
2005/0238271 A1 10/2005 Schafer
2022/0018389 A1 * 1/2022 Baracca ................ F16C 19/166

FOREIGN PATENT DOCUMENTS

DE 102020125964 A1 * 4/2022 .......... F16C 33/7823
EP 2435719 B1 4/2015
EP 2800915 B1 7/2020

OTHER PUBLICATIONS

Examination Report of the National Intellectual Property Office of Italy in Application No. 102023000009333, dated Jan. 16, 2024; 9pgs.

* cited by examiner

*Primary Examiner* — James Pilkington
(74) *Attorney, Agent, or Firm* — Stinson LLP

(57) ABSTRACT

A bearing unit (10) for adverse operating conditions. The bearing unit has an axis (X), outer and inner rings (20, 30), and a sealing assembly (50). The inner ring has two sliding surfaces (32) arranged axially on opposite sides of an outer raceway (31). The sealing assembly is arranged on both sides (L) of the outer ring to prevent contaminant entry. The sealing assembly has, on each side, an annular elastic gasket (70) with sealing lips (71) facing the inner ring and in sliding contact with the sliding surface (32) of the associated side. The sealing lips (71) have annular contact edges (74) with diameters decreasing in the axial direction towards the outside of the bearing unit. The sliding surfaces (32) are inclined with respect to the axis (X) in a decreasing manner from the outer raceway (31) for adjustment of the radial contact pressure of the lips (71).

14 Claims, 2 Drawing Sheets

BEARING UNIT FOR APPLICATIONS IN ADVERSE OPERATING CONDITIONS

CROSS-REFERENCE TO RELATED APPLICATION

This application claims priority to Italian Application No. 102023000009333, filed May 10, 2023, the entirety of which is hereby incorporated by reference.

FIELD

The present disclosure relates to a bearing unit for applications in adverse operating conditions.

BACKGROUND

The patent EP2435719B1 describes a bearing unit which is suitable for working in adverse operating conditions, such as agricultural earth-tilling applications, to which the present description will make reference without thereby losing its general character, and comprises:

a. an inner ring provided with an outer raceway and with two sliding surfaces arranged axially on opposite sides of the outer raceway;
b. an outer ring provided with an inner raceway;
c. a row of rolling bodies arranged inside the two raceways so as to allow relative rotation of the two rings; and
d. a sealing assembly for bearings, which comprises, in turn, for each side of the bearing unit, a metal screen supported by the outer ring and a multiple-lip elastic sealing gasket fastened to the metal screen and provided with a plurality of sealing lips or contact lips facing the inner ring and arranged in sliding contact with the respective sliding surface.

The bearing units of the type described in the aforementioned document, although proving to be highly effective in the adverse operating conditions in which they have had to operate, over time resulted in a number of problems which reduced their performance in some way. In fact, precisely because of the particularly adverse operating conditions in which these bearing units have to operate, their sealing assemblies must be provided with several sealing lips or contact lips, each of which must constantly make contact with the sliding surfaces of the inner ring in order to prevent the entry of contaminating material inside the said bearing unit and, even though these lips have been designed to be both strong and also sufficiently flexible, the friction which they exert against the sliding surfaces often is very pronounced.

Furthermore, still with reference to the bearing unit described in the aforementioned patent EP2435719B1, but above all with particular reference to the sealing assembly thereof, since, in order to optimize the production costs and processes, the respective sealing lips or contact lips are not completely independent of each other, but are connected together by a common root portion, which is located between the metal screen and the contact lips themselves, the latter are interdependent on each other both for the purposes of the sealing action and also with regard to the friction produced by them. In fact, said common root portion acts essentially not only as a rotation hinge for all the contact lips with respect to the metal screen supporting them, but also as a fulcrum for the sealing actions of the said contact lips with respect to the sliding surfaces; this makes it somewhat difficult to adjust these sealing actions so as to reduce them and improve the performance of the bearing unit without having to radically modify the configuration of the contact lips themselves, i.e. without having to sacrifice both their strength and flexibility.

SUMMARY

The object of the present disclosure is to provide a bearing unit for applications in adverse operating conditions, which, while maintaining essentially at least the same configuration of the respective sealing assembly, does not have the drawbacks described above, namely allows a substantial reduction of the friction produced.

According to the present disclosure a bearing unit for applications in adverse operating conditions having the characteristic features indicated in the attached claims is provided.

BRIEF DESCRIPTION OF THE DRAWINGS

The present disclosure will now be described with reference to the attached drawings which illustrate a non-limiting example of embodiment thereof, in which.

DETAILED DESCRIPTION

Figure 1:
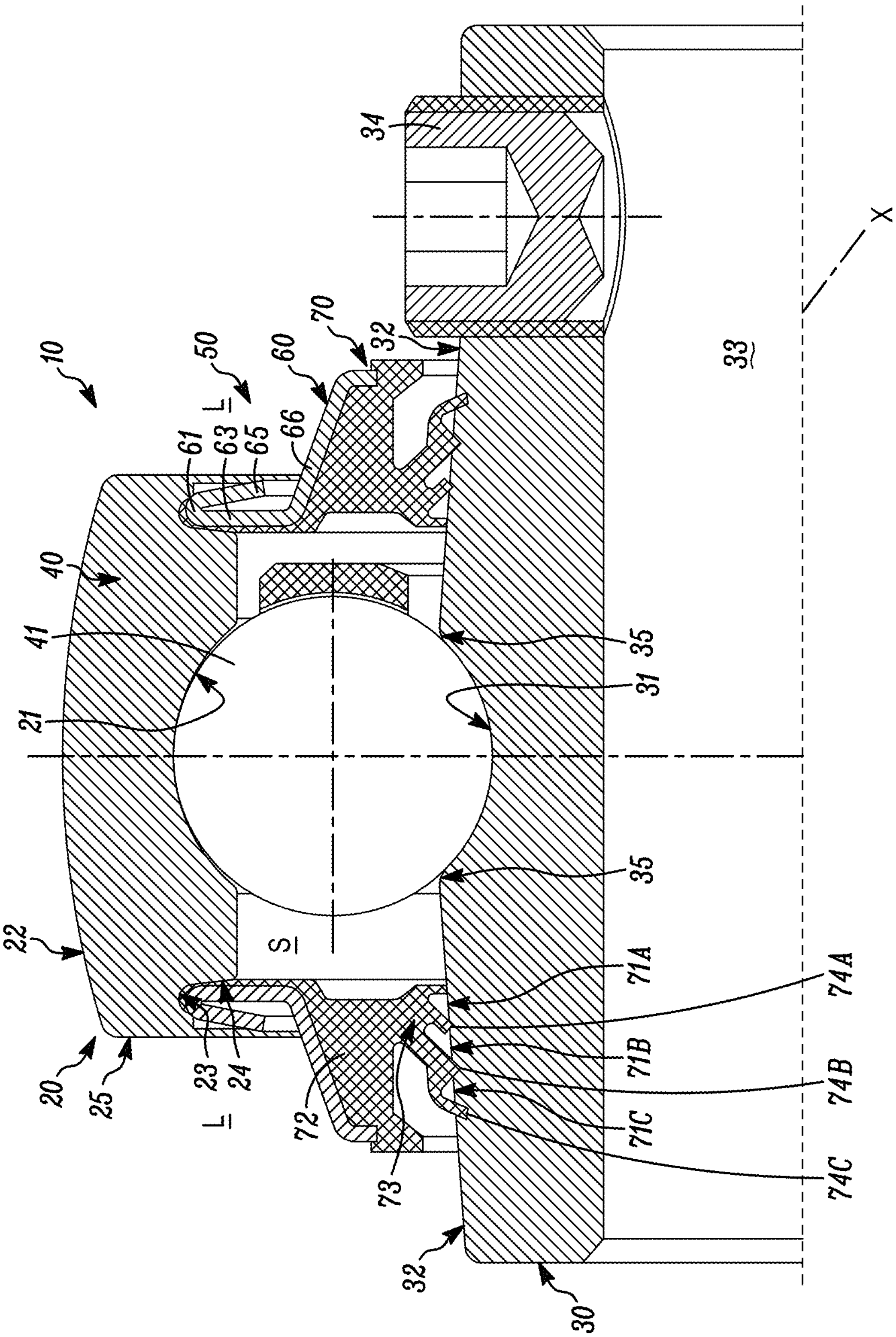
FIG. 1 shows an axially sectioned elevation view of a first preferred embodiment of a bearing unit for applications in adverse operating conditions according to the present disclosure.

With reference to FIG. 1, 10 denotes overall a bearing unit which is designed to operate in adverse operating conditions, such as agricultural earth-tilling applications, and to seat a shaft (not shown), designed to rotate about an axis X, and which comprises:

a. an outer ring 20 provided with an inner raceway 21 and with an outer convex spherical surface 22 which allows a certain degree of misalignment, but without allowing any axial displacement;
b. an inner ring 30 extending axially on both the sides L of the outer ring 20, rotatable with respect to the said outer ring 20 and provided with an outer raceway 31 and with two sliding surfaces 32 arranged axially on opposite sides of the outer raceway 31;
c. a row 40 of rolling bodies 41 arranged inside the two raceways 21 and 31 so as to allow relative rotation of the two rings 20 and 30, and
d. a bearing sealing assembly 50, which is arranged on both the axially opposite sides L of the outer ring 20 so as to sealingly close an annular space S between the inner ring 30 and the outer ring 20, preventing contaminating agents from entering into the bearing unit 10 and at the same time retaining the lubricating grease inside said unit, and which comprises in turn, for each side L of the outer ring 20, a stiffening insert 60 made of sheet metal and with an annular shape, supported by the said outer ring 20, and a multiple-lip, annular, elastic sealing gasket 70, made of elastomeric or rubbery material (preferably acrylonitrile butadiene rubber), joined by means of vulcanization to the insert 60 and provided, as will be described more fully below, with a plurality of sealing lips or contact lips 71 facing the inner ring 30 and arranged in sliding contact with the sliding surface 32 of the associated side L.

The inner ring 30 also has an inner cylindrical cavity 33 inside which the shaft (not shown) is mounted so as to be able to rotate about the axis X and a radial through-pin 34 for locking the said shaft (not shown).

For the purposes of assembly of the sealing assembly 50, the outer ring 20 has two internal circumferential grooves 23 arranged adjacent on both sides of the balls 41 and delimited, towards the balls 41, by respective annular surfaces 24 which are substantially perpendicular to the axis X and are arranged axially on the inside with respect to a corresponding outer annular wall 25 of the said outer ring 20.

Each insert 60 comprises:

a. an outer edge 61 which is designed to be folded inside the respective groove 23 so as to secure the assembly 50 in its operating position;

b. a disc portion 63, which extends radially inwards from the edge 61 and is perpendicular to the axis X so as to come into contact against the respective annular surface 24;

c. an axially angled or conical portion 65 which is connected to the disc portion 63 by means of the outer edge 61; and d. a further axially angled or conical portion 66 which is connected to the disc portion 63 on the same side as the axially angled or conical portion 65 and along the radially inner circumferences of the said disc portion 63.

The multiple-lip, annular, elastic sealing gasket 70 is, as already described, vulcanized together with the insert 60 and it is pointed out that in the attached drawings it is shown in its undeformed condition. The gasket 70 comprises:

a. a main body 72 which is in direct contact with the axially angled or conical portion 66; and b. three contact lips 71*a*, 71*b*, 71*c*, which extend generally in a radially inner direction from the main body 72, are configured to slide against the outer surface 32 of the inner ring 30 and have a common root portion 73 which is formed from the main body 72 and essentially acts as a rotation hinge for all three contact lips 71*a*, 71*b*, 71*c* with respect to the metal screen 60 supporting them, i.e. also with respect to the corresponding sliding surface 32.

The lip 71*a* is the lip of the three lips 71*a*, 71*b*, 71*c* situated most axially inwardly and is configured as a conical wall. The lip 71*a* extends from the common root portion 73 towards the sliding surface 32 in a manner substantially parallel to the axially angled or conical portion 66 and is provided with a thin annular edge 74*a* arranged in direct contact with the said sliding surface 32.

The lip 71*b* extends in a manner substantially parallel and adjacent to the lip 71*a* and is also configured as a conical wall. The lip 71*b* has a thickness which is equal to about twice the thickness of the lip 71*a* and is provided with a stub-like annular edge 74*b* having a width of about 90 degrees and arranged in direct contact with the sliding surface 32.

The lip 71*c* is formed directly from the lip 71*b*, on the opposite side of the lip 71*b* to the annular edge 74*a*, and to the lip 71*a* as well, and is also substantially configured as a conical wall. The lip 71*c* is the most flexible of the aforementioned lips and also has an annular edge 74*c* with a very thin form arranged in direct contact with the sliding surface 32.

As emphasized above, the multiple-lip, annular, elastic sealing gasket 70 is shown in FIG. 1 in its undeformed condition and, because of the aforementioned structure, the annular edges 74, i.e. 74*a*, 74*b*, 74*c* of the lips 71, i.e. 71*a*, 71*b* and 71*c*, have respective diameters which decrease axially towards the outside of the bearing unit 10; moreover, as a result of the aforementioned configuration, the lip 71*b* acts as a main sealing lip and is able to exert the maximum value in terms of radial pressure against the sliding surface 32, while the lip 71*a* is able to exert a medium radial pressure value less than the radial pressure value exerted by the lip 71*b*. Finally, the lip 71*c* will be able to exert a radial pressure less than the other two contact lips 71*a* and 71*b* and is able to act also as an anti-dust lip for protecting the lip 71*b*.

In order to control even more the radial contact pressure of the three lips 71*a*, 71*b*, 71*c* and adjust more precisely their values, in particular in the axial direction exploiting likewise the hinge effect provided by the common root portion 73 of the three lips 71*a*, 71*b* and 71*c* and, therefore, also in order to increase the performance of the sealing assembly 50, or of the bearing unit 10, the sliding surfaces 32 are inclined with respect to the axis X in a decreasing manner from the outer raceway 31, namely the sliding surfaces 32 are conical surfaces on which the average radial pressure value exerted by the three lips 71*a*, 71*b* and 71*c* gradually decreases towards the outside of the bearing unit 10 precisely because of their conicity.

The conicity of the sliding surfaces 32 results in a gradual reduction in the average radial pressure value exerted by the three lips 71*a*, 71*b* and 71*c* on the said sliding surfaces 32 since, for the same configuration of the multiple-lip, annular, elastic sealing gasket 70, the radial interference of the lips 71*a*, 71*b* and 71*c* is reduced, but this reduction occurs in an axially gradual manner, also depending on the reduction in the diameter values of the annular edges 74*a*, 74*b* and 74*c*, and with the advantage that the lips 71*a*, 71*b* and 71*c* in any case never lose contact with the sliding surfaces 32.

The sliding surfaces 32 extend axially towards the outside of the bearing unit 10 from the outer raceway 31, to which they are connected by means of respective radially outwardly convex connecting surfaces 35 with the advantage of gradually reducing the interference of the lips 71*a*, 71*b* and 71*c*, but without reducing the overall dimension of the outer raceway 31 itself; this ensures more correct contact between the balls 41 and the outer raceway 31 which, as is known, occurs along a contact ellipse which, in the case of purely radial loads, is centered on the outer raceway 31, but, in the case of loads which are also axial, tends to move axially towards the outside of the outer raceway 31. In such cases, the contact ellipse is no longer supported by the outer raceway 31 and is therefore interrupted, resulting in wear due to the sudden increase in loads and stress.

Without being limited to any specific theory in this connection, experimental tests carried out by the Applicant show that, as a result of the aforementioned configuration, i.e. owing to the fact that the common root portion 73 acts as a rotation hinge for all three lips 71*a*, 71*b* and 71*c* and that the sliding surfaces 32 are inclined with respect to the axis X in a decreasing manner from the outer raceway 31, it is possible to obtain more precise control and adjustment of the radial contact pressure of these three lips 71*a*, 71*b* and 71*c*, all of which can be achieved without having to modify at all the geometrical form of either the multiple-lip, annular, clastic sealing gasket 70 or of the outer raceway 31, this also helping reduce the production costs of the bearing unit 10.

Figure 2:
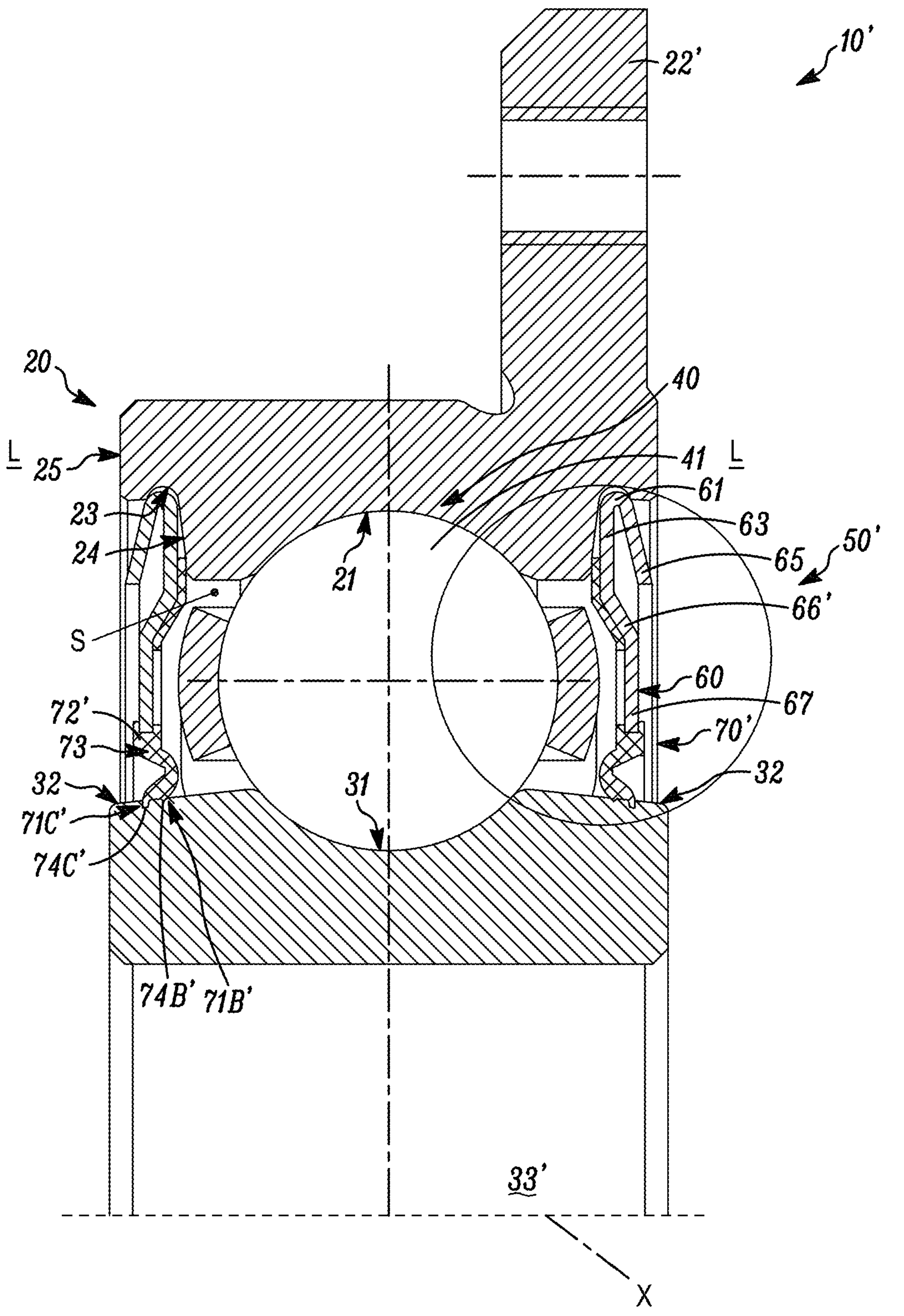
FIG. 2 shows an axially sectioned elevation view of a second preferred embodiment of the bearing unit according to FIG. 1.

The configuration of the preferred embodiment of the bearing unit 10 described above is advantageously applicable to all the bearing units which are provided with a multiple-lip, annular, clastic sealing gasket, such as the bearing unit 10' shown in FIG. 2; this bearing unit differs from the bearing unit 10 in that it is designed to work in adverse operating conditions, for example in applications on marble-cutting machines, where the particularly small axial dimensions are such that decidedly radical technological solutions must be adopted.

For the purposes of the present disclosure, the bearing unit 10' is similar to the bearing unit 10 and differs from it in that it is mounted in a marble-cutting machine and, therefore, must have an overall axial cross-section which is relatively narrow and in that it has a respective sealing assembly 50' which is very much simpler than the sealing assembly 50 so as to be able to reduce the overall axial dimensions, while being similar to the said assembly 50.

In particular, using for the description of the bearing unit 10' the same reference numbers as those used to describe the same component parts of the bearing unit 10, the bearing unit 10' comprises an outer raceway 20, which in this case is rotatable and provided with an outer flange 22' which, during use, is associated with a drive pulley for a diamond-coated wire (said parts being known and not shown), and a stationary inner ring 30, which is aligned on both sides L with the outer ring 20 and has a respective inner cylindrical cavity 33' having a diameter with notable dimensions, generally greater than 200 mm. The bearing unit 10' is normally mounted in a packed arrangement with other identical bearing units 10', and the overall axial cross-section must be as small as possible since it is decisive for defining a thickness of the marble slabs which can be obtained with the marble-cutting machine in which it is mounted.

In order, therefore, to reduce as far as possible the overall axial dimensions of the bearing unit 10', the respective sealing assembly 50' has a number of structural differences compared to the sealing assembly 50' described above. In particular, the sealing assembly 50' is provided with an annular elastic sealing gasket 70' which has an axially angled or conical portion 66' which is decidedly more inclined and has axial dimensions such that it remains axially within the axially angled or conical portion 65, and a disc-like extension 67' which extends radially towards the inside from the axially angled or conical portion 66'. The annular elastic sealing gasket 70 also has a main body 72' which is in substantial contact with the axially angled or conical portion 66', but is basically secured to the disc-like extension 67'; from the main body 72' only two contact lips 71*b*' and 71*c*' extend generally in a radially inward direction. Except for the decidedly smaller axial dimension, the overall configuration of the two contact lips 71*b*' and 71*c*' is similar to that of the two contact lips 71*b* and 71*c*: the lip 71*c*' is formed directly from the lip 71*b*' on the opposite side to the annular edge 74*a*, is substantially configured as a conical wall and is more flexible than the lip 71*b*' with its annular edge 74*c*' which has a diameter smaller than the diameter of the annular edge 74*b*'.

The two contact lips 71*b*' and 71*c*' are configured to slide against the outer surface 32 of the inner ring 30 and have a common root portion 73 which is formed from the main body 72, extending from the disc-like extension 67'.

Also in the case of the bearing unit 10', again in order to control even more the radial contact pressure of the two lips 71*b*, 71*c* and adjust more precisely their values, in particular in the axial direction exploiting likewise the hinge effect provided by the common root portion 73 of the two lips 71*b* and 71*c* and, therefore, also in order to increase the performance of the sealing assembly 50, i.e. of the bearing unit 10', the sliding surfaces 32 are inclined with respect to the axis X in a decreasing manner from the outer raceway 31, namely the sliding surfaces 32 are conical surfaces on which the average radial pressure value exerted by the two lips 71*b* and 71*c* gradually decreases towards the outside of the bearing unit 10' precisely because of their conicity.

Given the extremely small axial dimension or axial cross-section of the bearing unit 10', the fact that the configuration of the sliding surfaces 32 extending from the outer raceway 31 and of the respective convex connecting surfaces 35 allows a gradual reduction of the interference of the lips 71*b*' and 71*c*', without however reducing the overall dimension of the outer raceway 31 itself, is in this case particularly advantageous, considering that these bearing units 10' are axially gripped together with forces which are so strong that the respective raceways 31 would tend to be deformed.

Also in the case of the bearing unit 10', without being limited to any specific theory in this connection, experimental tests carried out by the Applicant show that, as a result of the aforementioned configuration, i.e. owing to the fact that the common root portion 73 acts as a rotation hinge for both lips 71*b*' and 71*c*' and that the sliding surfaces 32 are inclined with respect to the axis X in a decreasing manner from the outer raceway 31, it is possible to obtain more accurate control and adjustment of the radial contact pressure of these two lips 71*b*' and 71*c*', all of which without having to modify in any way the geometrical form of either the multiple-lip, annular, elastic sealing gasket 70' or of the outer raceway 31, this also helping reduce the production costs of the bearing unit 10'.

It is understood that the present disclosure is not limited to the embodiments described and illustrated here, which are to be regarded as examples of embodiment of the bearing unit, which is instead subject to further modifications with regard to forms and arrangements of parts, constructional details and assembly.

What is claimed is:

1. A bearing unit having an axis and comprising:

an outer ring provided with an inner raceway;

an inner ring provided with an outer raceway and with two sliding surfaces arranged axially on opposite sides of the outer raceway, each sliding surface extending to an axial outer end of the inner ring, the sliding surfaces being connected to the outer raceway by means of respective radially outwardly convex connecting surfaces, each connecting surface transitioning into the respective sliding surface to form a continuous surface without steps; and a sealing assembly which is arranged on both the axially opposite sides of the outer ring so as to sealingly close an annular space between the inner ring and the outer ring, preventing contaminating agents from entering the bearing unit, and which comprises in turn, for each side of the outer ring, a stiffening insert supported by the outer ring, and an annular elastic gasket provided with a plurality of sealing lips facing the inner ring and arranged in sliding contact with the sliding surface of the respective side, the sealing lips comprising respective annular contact edges with diameters decreasing in the axial direction towards the outside of the bearing unit, the sliding surfaces being inclined with respect to the axis in a decreasing manner from the outer raceway for control and adjustment of the radial contact pressure of the sealing lips.

2. The bearing unit according to claim 1, wherein the sealing assembly comprises, for each side, two sealing lips of the plurality of sealing lips having a common root portion which acts as a hinge for rotation of the said two sealing lips.

3. The bearing unit according to claim 2, wherein the sealing assembly comprises, for each side, the stiffening insert secured in the outer ring and the annular elastic gasket having a main body in direct contact with the stiffening insert and forming the common root portion.

4. The bearing unit according to claim 3, wherein, for each side, a first sealing lip of the two sealing lips extends directly from a second sealing lip of the two sealing lips, the first sealing lip having a greater flexibility than the second sealing lip.

5. The bearing unit according to claim 1, wherein the outer ring is provided with an outer, convex, spherical surface which allows a certain degree of misalignment, but without allowing any axial displacement.

6. The bearing unit according to claim 1, wherein the outer ring is provided with an outer flange associated during use with a drive pulley for a diamond-coated wire.

7. The bearing unit according to claim 6, wherein the bearing unit is part of a marble cutting machine.

8. The bearing unit according to claim 1, wherein each sliding surface is a conical surface.

9. The bearing unit according to claim 8, wherein the entirety of each sliding surface is without steps.

10. The bearing unit according to claim 9, wherein the entirety of each connecting surface is without steps.

11. The bearing unit according to claim 1, wherein the plurality of sealing lips comprises three sealing lips.

12. The bearing unit according to claim 1, wherein the stiffening insert is metallic.

13. The bearing unit according to claim 1, further comprising a row of rolling elements arranged between the outer ring and the inner ring.

14. The bearing unit according to claim 13, wherein the rolling elements are balls.

* * * * *